United States Patent
Wang

(10) Patent No.: US 10,396,633 B2
(45) Date of Patent: Aug. 27, 2019

(54) HAPTIC DEVICE

(71) Applicant: Eric K. Wang, San Jose, CA (US)

(72) Inventor: Eric K. Wang, San Jose, CA (US)

( * ) Notice: Subject to any disclaimer, the term of this patent is extended or adjusted under 35 U.S.C. 154(b) by 254 days.

(21) Appl. No.: 15/418,761

(22) Filed: Jan. 29, 2017

(65) Prior Publication Data

US 2017/0271962 A1  Sep. 21, 2017

Related U.S. Application Data

(60) Provisional application No. 62/449,081, filed on Jan. 22, 2017, provisional application No. 62/310,765, filed on Mar. 20, 2016.

(51) Int. Cl.

| | |
|---|---|
| *H02K 11/00* | (2016.01) |
| *H02K 11/21* | (2016.01) |
| *G08B 6/00* | (2006.01) |
| *H02K 7/04* | (2006.01) |
| *H02K 7/116* | (2006.01) |
| *H02K 5/15* | (2006.01) |
| *H02K 5/173* | (2006.01) |
| *H02K 5/24* | (2006.01) |

(52) U.S. Cl.
CPC ............ *H02K 11/21* (2016.01); *G08B 6/00* (2013.01); *H02K 5/15* (2013.01); *H02K 5/1732* (2013.01); *H02K 7/04* (2013.01); *H02K 7/116* (2013.01); *H02K 5/24* (2013.01); *H02K 7/1166* (2013.01)

(58) Field of Classification Search
CPC . H02K 11/21; H02K 5/15; H02K 5/24; H02K 5/1732; H02K 7/04; H02K 7/116; H02K 7/1166; G08B 6/00

USPC .......... 310/68, 12.14, 81, 25, 51; 340/407.2
See application file for complete search history.

(56) References Cited

U.S. PATENT DOCUMENTS

| | | | | |
|---|---|---|---|---|
| 9,995,284 | B1* | 6/2018 | Gutsche | F03G 3/08 |
| 2015/0015117 | A1* | 1/2015 | Lee | H02K 33/00 |
| | | | | 310/328 |
| 2016/0080897 | A1* | 3/2016 | Moore | H04W 4/02 |
| | | | | 340/539.13 |
| 2018/0071874 | A1* | 3/2018 | Bergeron | B23Q 1/54 |

OTHER PUBLICATIONS

Brochure of the Geomagic® Touch™ Haptic Device with copyright date of 2016 found on the following website: http://www.geomagic.com/en/products/phantom-omni/overview.

(Continued)

*Primary Examiner* — Thanh Lam
(74) *Attorney, Agent, or Firm* — Michael B. Einschlag

(57) ABSTRACT

One embodiment is an untethered, handheld, kinesthetic, haptic device that produces torque using gyroscopic precession to eliminate the need for a grounded surface. In particular, one embodiment is a haptic device that includes: (a) an angular momentum generator apparatus; and (b) a torque generator apparatus coupled to the angular momentum generator apparatus; wherein: (i) the angular momentum generator apparatus is capable of generating a predetermined angular momentum; and (ii) the torque generator apparatus is capable of applying a torque to cause the angular momentum generator apparatus to rotate about a direction perpendicular to the direction of the angular momentum.

11 Claims, 5 Drawing Sheets

(56) References Cited

OTHER PUBLICATIONS

Article entitled "The Cutting Edge of Haptics, Touch-based interfaces get to the point." by Duncan Graham-Rowe, MIT Technology Review, Aug. 25, 2006 found on the following website: https://www.technologyreview.com/s/406335/the-cutting-edge-of-haptics/.
Discussion of Pulse Width Modulation and the "ATMEGA168A Pulse Width Modulation—PWM" product found on the following protostack website: http://www.protostack.com/blog/2011/06/atmega168a-pulse-width-modulation-pwm/.
Article entitled "Gyroscope Physics," Jul. 5, 2015, found on the following website: http://www.cleonis.nl/physics/phys256/gyroscope_physics.php.
Article entitled "Gyroscopic Precession," Mar. 31, 2011, found on the following website: http://farside.ph.utexas.edu/teaching/336k/Newtonhtml/node70.html.
A video on Youtube by Professor Lewin of MIT entitled: "Lec 24: Rolling Motion, Gyroscopes | 8.01 Classical Mechanics, Fall 1999 (Walter Lewin)" found on the following website: https://www.youtube.com/watch?v=N92FYHHT1qM.

\* cited by examiner

HAPTIC DEVICE

This patent application relates to U.S. Provisional Application No. 62/310,765 filed Mar. 20, 2016 from which priority is claimed under 35 USC § 119(e), and which provisional application is incorporated herein in its entirety. This patent application also relates to U.S. Provisional Application No. 62/449,081 filed Jan. 22, 2017 from which priority is claimed under 35 USC § 119(e), and which provisional application is incorporated herein in its entirety.

TECHNICAL FIELD

One or more embodiments relate to haptic devices. In particular, one or more embodiments relate to an untethered haptic device utilizing gyroscopic precession. In further particular, one or more embodiments relate to a haptic device that produces torque using gyroscopic precession to eliminate the need to be fixed or tethered to a grounded surface.

BACKGROUND

Commonplace, in entertainment media, household appliances, and so forth, haptic devices stimulate a person's sense of touch using physical forces to provide feedback. The word "haptics" comes from a Greek root that roughly translates to "touch." As such, haptic technology is found in a wide range of applications, from vibrator-chips found in cell phones to da Vinci® surgical systems that enable surgeons to perform incisions remotely while receiving touch feedback.

Haptic devices typically fall into two categories: cutaneous and kinesthetic. Cutaneous haptic devices stimulate the human skin, thereby simulating different textures, temperatures, viscosities, or vibrations. Since the surface of the human skin exhibits extreme sensitivity, cutaneous haptic devices do not need to exert large forces on the surface of the skin to simulate a texture; however, cutaneous haptic devices must be extremely accurate to simulate a virtual texture. An example of a cutaneous haptic device is a Wii™ remote console, an entertainment device that uses a vibration chip to alert a user to certain events. While the vibrations do not replicate textures, they send cutaneous feedback to the user.

A kinesthetic haptic device, on the other hand, simulates a spatial touch environment by exerting forces on, for example, a hand. Kinesthetic haptic devices constitute most of the complex haptic devices available today because such kinesthetic haptic devices typically need to exert a wide range of forces and must be preprogrammed to correctly simulate environments. For instance, a Geomagic® Touch™ haptic device sold by Geomagic, Inc. can simulate a simple linear spring using Hooke's Law to generate forces depending on how far a user pushes a stylus away from a predetermined point.

Haptic devices are used in research facilities to conduct human touch experiments or to develop commercial products such as the da Vinci® surgical systems. However, these haptic devices suffer from the same issue, i.e., their need to be grounded on a nonmoving surface. For example, the Geomagic® Touch™ haptic device sold by Geomagic, Inc. has six degrees of freedom, with an ability to generate a maximum force of 3.3 Newtons in the xyz Cartesian plane. FIG. 1 shows a perspective view of the Geomagic® Touch™ haptic device. As shown in FIG. 1, a mounted base holds a swiveling sphere which, in turn, supports a two stage lever arm tipped with a graspable stylus. FIG. 2 is a diagram illustrating the six (6) degrees of freedom of the haptic device shown in FIG. 1. As indicated in FIG. 2, the six degrees of freedom consist of $\theta_1$, $\theta_2$, $\theta_3$, $q_2$, $q_3$, and the swiveling stylus. In use, a user grips the stylus shown in FIG. 1 and, depending on software, the user will experience a virtual touch environment. However, like many so-called high-grade haptic devices, the Geomagic® Touch™ haptic device must sit securely on an immovable surface to generate any force.

Because such position-sensing haptic devices lack an ability to operate freely in a user's hands without being bound to a surface, typical commercial haptic devices generate forces using methods that include using cellphone vibration chips or watch clickers. Most consumers treat functional haptic features on gadgets such as the Apple Watch as gimmicks rather than helpful features.

SUMMARY

One or more embodiments solve one or more of the problems or issues set forth above in the Background. In particular, one or more embodiments comprise a haptic device that generates forces/torques without being tethered. In further particular, one or more embodiments comprise a haptic device comprising an oscillating gyroscopic precession system. In further particular, one or more embodiments comprise a portable haptic device. In further particular, one or more embodiments comprise a lightweight portable haptic device. In further particular, one or more embodiments comprise a haptic device that generates forces/torques that are perceivable to a user. In further particular, one or more embodiments comprise a haptic device that generates a range of forces/torques. In further particular, one or more embodiments comprise a haptic device that generates forces/torques in an array of directions.

In particular, one embodiment is a haptic device that comprises: (a) an angular momentum generator apparatus; and (b) a torque generator apparatus coupled to the angular momentum generator apparatus; wherein: (i) the angular momentum generator apparatus is capable of generating a predetermined angular momentum; and (ii) the torque generator apparatus is capable of applying a torque to cause the angular momentum generator apparatus to rotate about a direction perpendicular to the direction of the angular momentum.

DETAILED DESCRIPTION

Proprioception is the intrinsic human ability of spatial awareness. If given an initial reference point, any person can feel three-dimensional movements in his/her hands caused by an external force. While kinesthesia in smaller joints, such as an arm, rely on cutaneous skin sensations, larger sections of the human body can sense physical forces in the joints alone. Gabriel Robles-De-La-Torre, a neuroscientist and founder of the International Society for Haptics, described this phenomenon as follows: "the brain could be fooled into thinking it's being poked simply by applying lateral forces." One or more embodiments rely on human proprioception to simulate forces/torques without the need of a grounded haptic device as is the case for the prior art.

Figure 1:
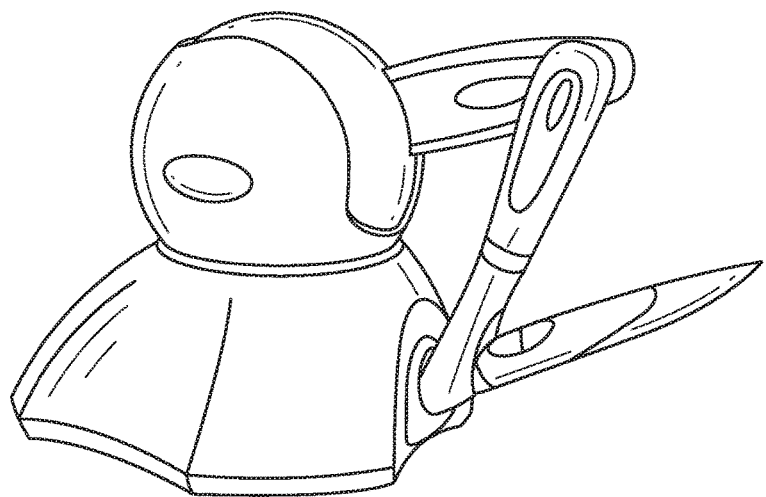
FIG. 1 is a perspective view of a Geomagic® Touch™ haptic device sold by Geomagic Inc.
Figure 2:
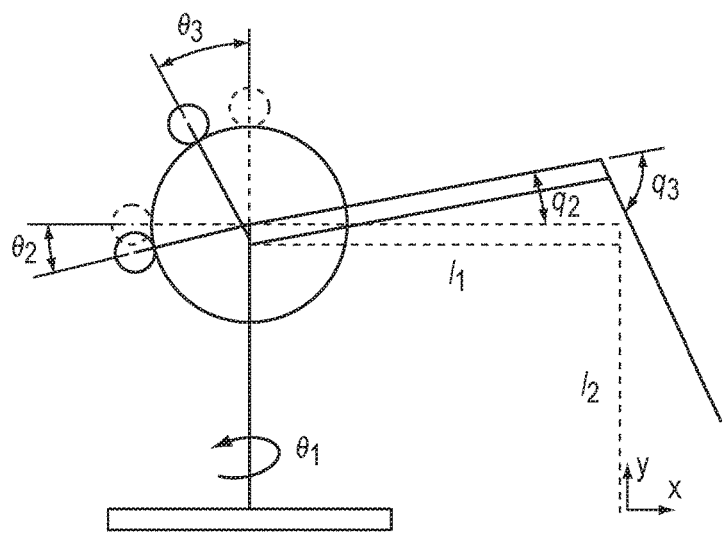
FIG. 2 is a diagram illustrating six (6) degrees of freedom of the haptic device shown in FIG. 1.
Figure 3:
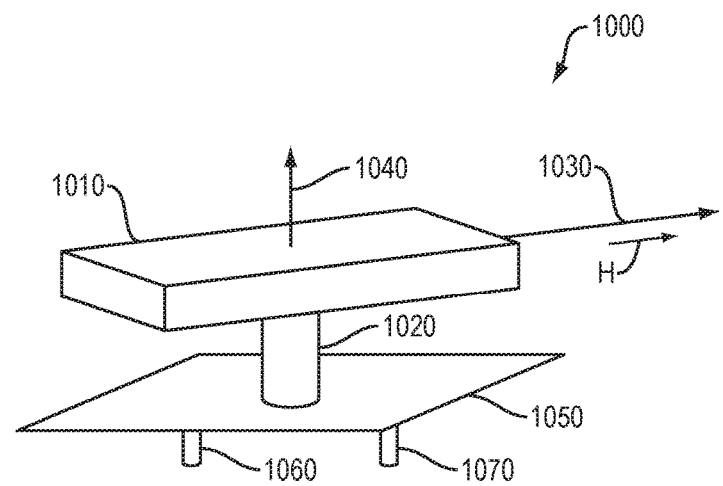
FIG. 3 is a schematic diagram of haptic device 1000 that is fabricated in accordance with one or more embodiments.

FIG. 3 is a schematic diagram of haptic device 1000 that is fabricated in accordance with one or more embodiments. As shown in FIG. 3, haptic device 1000 comprises angular momentum generator apparatus 1010 coupled to torque generator apparatus 1020. In accordance with one or more such embodiments, angular momentum generator apparatus 1010 includes a mechanism that generates a net angular momentum ($\vec{H}$) along an axis pointing in the direction of arrow 1030, and torque generator apparatus 1020 includes a mechanism that applies a torque ($\vec{\tau}$) to angular momentum generator apparatus 1010, which torque causes angular momentum generator apparatus 1010, and thereby, net angular momentum ($\vec{H}$), to rotate about an axis pointing in the direction of arrow 1040. In accordance with one or more such embodiments, arrows 1030 and 1040 are orthogonal to each other.

In accordance with one or more such embodiments, torque generator apparatus 1020 includes a torque motor system (not shown in FIG. 3 for ease of understanding) that includes one or more motors coupled, for example and without limitation, by one or more gears, to angular momentum generator apparatus 1010 to cause angular momentum generator apparatus 1010 to rotate about an axis pointing in the direction of arrow 1040.

As further shown in FIG. 3, haptic device 1000 comprises base 1050 which is coupled to torque generator apparatus 1020 and to a handle mechanism (comprised of, for example and without limitation, handles 1060 and 1070). Base 1050 is coupled to torque generator apparatus 1020 (in accordance with one or more embodiments, base 1050 is coupled to torque generator apparatus 1020 so that steady/continuous rotation of angular momentum generator apparatus 1010 about the axis pointing in the direction of arrow 1040 does not cause rotation of base 1050). The handle mechanism may be adapted so that a user may hold it using one hand or, preferably two hands (for example, using handles 1060 and 1070), and thereby hold haptic device 1000. Thus, in accordance with one or more embodiments, a user senses forces/torques, i.e., haptic output, generated by haptic device 1000 through the handle mechanism. Although the handle mechanism is shown in FIG. 3 as being affixed to the bottom of base 1050, embodiments are not restricted thereby. In fact, further embodiments exist where a handle mechanism comprises handles affixed to sides of base 1050 or where a handle mechanism is affixed to torque generator apparatus 1020 (however, in this case, the handle mechanism is coupled to torque generator apparatus 1020 so that steady/continuous rotation of angular momentum generator apparatus 1010 about the axis pointing in the direction of arrow 1040 does not cause a rotation of the handle mechanism).

As will be described below, the magnitude of the torque produced by haptic device 1000 ($\tau_{haptic\ output}$) is believed to be given by the following (note that the force/torque is felt by the hand(s) of a user holding the handle mechanism, for example and without limitation, comprised of handles 1060 and 1070):

$$\tau_{haptic\ output} = I_A * \omega_B * \omega_C$$

where: $I_A$ is the moment of inertia of angular momentum generator apparatus 1010 (i.e., the portion thereof that generates $\vec{H}$) with respect to an axis pointing in the direction of arrow 1030; $\omega_B$ is the value of angular velocity, about an axis pointing in the direction of arrow 1040, of angular momentum generator apparatus 1010 (i.e., the portion thereof that generates $\vec{H}$); and $\omega_C$ is the value of angular velocity of angular momentum generator apparatus 1010 (i.e., the portion thereof that generates $\vec{H}$) about an axis pointing in the direction of arrow 1030.

In accordance with one or more further embodiments, angular momentum generator apparatus 1010 includes a momentum apparatus (not shown for ease of understanding) such as, for example and without limitation, one or more motor controllers, which momentum apparatus controls the magnitude of net angular momentum $\vec{H}$. As will be described below, in accordance with one or more embodiments, the magnitude of net angular momentum $\vec{H}$ will be controlled with respect to the angle of rotation of $\vec{H}$ about an axis pointing in the direction of arrow 1040. Further, in accordance with one or more further embodiments, torque generator apparatus 1020 includes a torque apparatus (not shown for ease of understanding) such as, for example and without limitation, a motor controller, which controller is coupled to the torque motor system to control the magnitude of the torque applied by torque generator apparatus 1020 to angular momentum generator apparatus 1010. Still further, in accordance with one or more further embodiments, haptic device 1000 includes a position sensor (not shown for ease of understanding) whose output enables haptic device 1000 to determine the angle of rotation of $\vec{H}$ about the axis pointing in the direction of arrow 1040. In accordance with one or more embodiments, the position sensor is placed at one or more locations on haptic device 1000 where its output enables the angle of rotation to be determined (for example and with limitation, on angular momentum generator apparatus 1010, torque generator apparatus 1020 or base 1050). In accordance with one or more such embodiments, the position sensor may transfer the location of a mark to a haptic device controller. Still further, in accordance with one or more further embodiments, haptic device 1000 includes a haptic device controller (not shown for ease of understanding) which controls the haptic output by sending commands to one or more of the momentum apparatus and the torque apparatus. For example and without limitation, in accordance with one or more embodiments, the haptic device controller may send a message to the torque apparatus that specifies values of torque. For example and without limitation, in accordance with one or more embodiments, the haptic device controller may send a message to the momentum apparatus that specifies values of net angular momentum.

Several scenarios are described below to enable one to understand better how haptic device 1000 operates. Scenario 1: Let the magnitude of $\vec{H}$=0. In this scenario, angular momentum generator apparatus 1010 will rotate about an axis pointing in the direction of arrow 1040, which rotation is caused by torque generator apparatus 1020. As a result, the direction of $\vec{H}$ will rotate, but because the magnitude of $\vec{H}$ equals zero, a user would not feel haptic output. In other words, if the magnitude of $\vec{H}$ were=0 at any angular position while angular momentum generator 1010 rotated about the axis pointing in the direction of arrow 1040, the user would not feel haptic output.

Scenario 2: Let the magnitude of $\vec{H}$ be non-zero in a small angular region when angular momentum generator 1010 rotates about the axis pointing in the direction of arrow 1040. In this case, the user will feel haptic output through handles 1060 and 1070 as the angular position of $\vec{H}$ falls within the small angular region. In particular, the user will sense haptic output as a force/torque that will cause handles 1060 and 1070 to rotate about a haptic output line pointing in a direction perpendicular to the directions shown by arrows 1040 and 1030 when the angular position of $\vec{H}$ is disposed in the small angular region.

Scenario 3: Let the magnitude of $\vec{H}$ be non-zero in a small angular region when angular momentum generator 1010 rotates about the axis pointing in the direction of arrow 1040. Further, let there be several such small angular regions. In this case, the user would sense haptic output as the angular position of $\vec{H}$ falls within each of the small angular regions; in addition, the direction of the haptic output would change since the orientation of the haptic output line changes.

In accordance with one or more embodiments, the direction of haptic output of haptic device 1000 can be changed by controlling the generation of $\vec{H}$, i.e., by controlling when its magnitude is zero and when it is not. Further, the magnitude of the haptic output can be changed by changing the magnitude of torque applied by torque generator apparatus 1020 and by changing the magnitude of $\vec{H}$.

Figure 4:
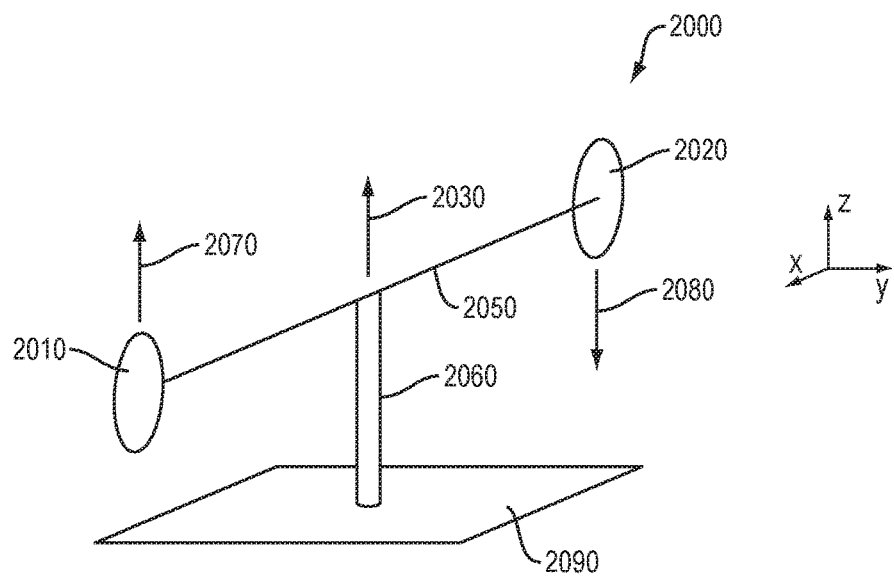
FIG. 4 is a schematic diagram of haptic device 2000 that is fabricated in accordance with one or more further embodiments.

FIG. 4 is a schematic diagram showing portions of haptic device 2000 that is fabricated in accordance with one or more further embodiments. As shown in FIG. 4, haptic device 2000 comprises gyroscopes 2010 and 2020 that are identical and are mounted on a rotatable structure (not shown in FIG. 4 for ease of understanding). As further indicated in FIG. 4, the symmetry axes of gyroscopes 2010 and 2020 are disposed in a line 2050 that lies in the x-y plane. As still further indicated in FIG. 4, gyroscopes 2010 and 2020 are capable of rotating oppositely to each other about their respective axes to enable creation of a net angular momentum along line 2050 joining their axes. Gyroscopes 2010 and 2020 generate a net angular momentum vector in the x-y plane. Motors (not shown for ease of understanding) are coupled to gyroscopes 2010 and 2020, respectively, to cause them to spin, and thereby generate predetermined values of angular momentum. Since the gyroscopes' individual angular momentum directions oppose each other when rotating oppositely, in order to result in an overall net angular momentum, their angular velocities must differ, in other words, one must spin faster than the other. In accordance with one or more embodiments, the motors that cause gyroscopes 2010 and 2020 to spin operate under control of motor controllers (not shown for ease of understanding) which send signals to motors coupled to gyroscopes 2010 and 2020, thereby causing them to spin at predetermined angular velocities to generate predetermined values of net angular momentum. It should be clear to those of ordinary skill in the art that the net angular momentum would equal zero if the angular velocities of gyroscopes 2010 and 2020 were equal and the gyroscopes were directed to rotate in opposite directions.

Lastly, as indicated in FIG. 4, a torque is applied by coupler 2060 (for example and without limitation, an axle, a gear mechanism, and so forth) to the rotatable structure, which rotatable structure, in turn, applies the torque to gyroscopes 2010 and 2020 about an axis in the direction of arrow 2030. As a result, haptic device 2000 generates a net torque in the z direction which provides gyroscopic precession in the directions indicated by arrows 2070 and 2080. In accordance with the law of action and reaction, an equal and oppositely directed torque is generated on base 2090, causing it to rotate. Lastly, handles (not shown in FIG. 4 for ease of understanding) attached to base 2090 enable a user to hold haptic device 2000. In use, the user will sense movement of base 2090 provided by the gyroscopic precession. Further, this rotation will be generated about an axis along a direction perpendicular to arrow 2030 and line 2050.

As used herein, a gyroscope is any object that becomes subject to gyroscopic phenomena. In accordance with one or more embodiments, a gyroscope comprises a spinning wheel. Although one or more embodiments are described utilizing such a gyroscope for ease of understanding, many other types of gyroscope that exist in the art and which are well known to those of ordinary skill in the art are suitable for use in fabricating one or more embodiments. As such, one or more embodiments contemplate the use of one or more other types of gyroscopes such as, for example and without limitation, a MEMS gyroscope, a hemispherical resonator gyroscope ("HRG"), vibrating structure gyroscope ("VSG"), also called a Coriolis vibratory gyroscope ("CVG"), dynamically tuned gyroscope ("DTG"), a ring laser gyroscope, a fiber optic gyroscope, and so forth.

Haptic device 2000 described with respect to FIG. 4 will be used in the following description of how haptic torque is determined for one or more embodiments. For ease of understanding, the following description will: (a) refer to the pair of oppositely rotating gyroscopes as a gyroscope; (b) refer to the common direction of the symmetry axes of the gyroscopes as a gyroscope symmetry axis; and (c) refer to the net angular momentum of the pair of gyroscopes as the gyroscope angular momentum.

Euler angles can be used to describe the orientation of a rigid body in a moving coordinate system with respect to a fixed coordinate system. The fixed (or reference) coordinate system has XYZ axes and the moving coordinate system has xyz axes. The symmetry axis of the body (or gyroscope) is assumed to align with, and rotate about, the z axis of the moving coordinate system. Movement of the xyz axes of the moving coordinate system are measured with respect to the XYZ axes of the fixed (or reference) coordinate system. As such, the Euler angles are defined as follows: (a) θ represents an angle between the Z axis and the z axis (i.e., it is a measure of the tilt of the symmetry axis of the gyroscope); (b) Φ represents an angle of rotation around the z axis (i.e., it is a measure of the spin rotation of the gyroscope); and (c) Ω represents an angle of rotation around the Z axis (i.e., a measure of the precession of the gyroscope).

Let: (a) $\vec{\Omega}$ represent the angular velocity of the xyz moving coordinate system spinning around the Z axis and (b) $\vec{\omega}$ represent the total angular velocity of the gyroscope in the XYZ reference coordinate system. Referring to haptic device 2000 shown in FIG. 4, θ equals 90° as the gyroscope is oriented a quarter of a circle from the direction of torque, shown by arrow 2030. Also, in accordance with one or more embodiments, let the net angular velocity of the gyroscope be constant (i.e., the angular velocity of the gyroscope is the spin velocity of the gyroscope about its symmetry axis or $\dot{\Phi}$). Thus, the time derivative of the gyroscope's angular velocity about the symmetry axis, i.e., the time derivative of the angular velocity about the z axis, equals 0.

Thus, θ=90°; $\ddot{\Phi}$=0 (1)

The torque ($\vec{\tau}$) applied to the gyroscope equals the time derivative of the angular momentum of the gyroscope $\vec{H}$. Using Coriolis' Theorem, the angular momentum can be expressed as the sum of two terms: (a) the first term is the time derivative of the component of the angular momentum along the new axis (i.e., the z axis); and (b) the second term is the cross product of the angular velocity of the moving coordinate system around the reference coordinate system (i.e., the angular velocity of the xyz axes spinning around the XYZ axes) and the angular momentum of the gyroscope.

$$\vec{\tau} = \dot{\vec{H}} = \frac{d}{dt}\vec{H}_\Phi + \vec{\Omega} \times \vec{H} = \vec{\Omega} \times \vec{H} \quad (2)$$

As set forth in eqn. (1), the spin angular velocity of the gyroscope does not change, and as a result, the first term in eqn. (2) equals 0. Next, $\vec{\Omega}$ can be expressed as the vector sum of its components with respect to the xyz moving axes.

$$\vec{\Omega} = -\Omega \sin\theta \vec{\imath} + \Omega \cos\theta \vec{k} \quad (3)$$

The angular velocity of the gyroscope in the XYZ reference system is the sum of their spin angular velocity and the angular velocity of the xyz axes around the XYZ reference system.

$$\vec{\omega} = \dot{\Phi} + \vec{\Omega} = -\Omega \sin\theta \vec{\imath} + (\dot{\Phi} + \Omega \cos\theta)\vec{k} \quad (4)$$

Using a moment of inertia tensor (assuming the body to be symmetric), the angular momentum of the gyroscope ($\vec{H}$) can be expressed as a dot product of the moment of inertia tensor and the angular velocity of the gyroscopes.

$$\vec{H} = [I]_{3\times3} \cdot \vec{\omega} = \begin{bmatrix} I_{xx} & 0 & 0 \\ 0 & I_{yy} & 0 \\ 0 & 0 & I_{zz} \end{bmatrix} \cdot \vec{\omega} = -I_{xx}\Omega\sin\theta\vec{\imath} + I_{zz}(\dot{\Phi} + \Omega\cos\theta)\vec{k} \quad (5)$$

The values derived for $\vec{\Omega}$ and $\vec{H}$ can used in eqn. (2), to yield the cross product:

$$\vec{\tau} = (-\Omega\sin\theta\vec{\imath} + \Omega\cos\theta\vec{k}) \times (-I_{xx}\Omega\sin\theta\vec{\imath} + I_{zz}(\dot{\Phi} + \Omega\cos\theta)\vec{k}) \quad (6)$$

$$= \begin{bmatrix} \vec{\imath} & \vec{\jmath} & \vec{k} \\ -\Omega\sin\theta\vec{\imath} & 0 & \Omega\cos\theta\vec{k} \\ -I_{xx}\Omega\sin\theta\vec{\imath} & 0 & I_{zz}(\dot{\Phi} + \Omega\cos\theta)\vec{k} \end{bmatrix}$$

Carrying out the cross product relates the torque along the y axis to the precession rate and the angular momentum of the gyroscope (since as set forth above from eqn. (1) that θ is equal to 90°, the rightmost term cancels out).

$$\tau_y = \Omega\dot{\Phi}\sin\theta\left[I_{zz} + (I_{zz} - I_{xx})\frac{\Omega}{\dot{\Phi}}\cos\theta\right] = \Omega\dot{\Phi}I_{zz} \quad (7)$$

The terms for torque, precession speed, and angular momentum of the gyroscope can be rewritten in terms of haptic kinematics.

$$\tau_y = \tau; \quad \Omega = \omega_{precession}; \quad I_{zz}\dot{\Phi} = H \quad (8)$$

Solving for the precession rate yields the ratio between the torque exerted on the gyroscope and the angular momentum of the gyroscope.

$$\omega_{precession} = \tau/H \quad (9)$$

To determine the magnitude of the torque felt by the user, the principle of conservation of power in any mechanical system is used. This principle states that the rate at which a motor that exerts torque on a system provides kinetic energy is equivalent to the rate at which the system provides kinetic energy as an output.

$$P_{motor} = P_{output} \quad (10)$$

The power of a rotational motor can be expressed as the product of its torque and its angular speed. Thus:

$$\tau_{motor} * \omega_{motor} = \tau_{feel} * \omega_{precession} \quad (11)$$

Then, using eqn. (9), the ratio between torque of the motor and the angular momentum of the gyroscope is substituted to replace the rate of precession.

$$\tau_{motor} * \omega_{motor} = \tau_{feel} * \frac{\tau_{motor}}{H_{gyroscope}} \quad (12)$$

Finally, the torque felt by the user is obtained as the product of the angular speed of the motor and the angular momentum of the gyroscope.

$$\tau_{feel} = \omega_{motor} * H_{gyroscope} = I_{gyroscope} * \omega_{motor} * \omega_{gyroscope} \quad (13)$$

As a result, the output torque of inventive haptic device 2000 is directly proportional to both the angular speed of the driving motor and the angular speed of the gyroscope.

For a predetermined value of angle of rotation of a rotatable structure that supports gyroscopes 2010 and 2020 and value of net angular momentum of the gyroscope, as described above, $\tau_{feel}$ is developed which causes haptic device 2000 to rotate about an axis perpendicular to the direction of angular momentum of the gyroscope and the direction of arrow 2030. Thus, as the rotatable structure rotates, and thereby, the direction of angular momentum changes, so too does the orientation of the line about which the haptic output torque acts.

The following describes how haptic device 2000 operates in the use. Assume that the rotatable structure of haptic device 2000 is rotated in the x-y plane (refer to FIG. 4) from a first position to a second position. If the net angular momentum produced by gyroscopes 2010 and 2020 is non-zero at the first position, haptic device 2000 will rotate about an axis perpendicular to line 2050 and arrow 2030 at the first position. Likewise, if the net angular momentum produced by gyroscopes 2010 and 2020 is non-zero at the second position, haptic device 2000 will rotate about an axis perpendicular to line 2050 and arrow 2030 at the second position. Further, there will be no such rotation at the first or second position if the net angular momentum is zero at either of these positions. Thus, in accordance with the one or more embodiments, direction of the force/torque produced by haptic device 2000 can be provided over a range of positions by controlling the net angular momentum provided by gyroscopes 2010 and 2020 at the positions. In other words, and for example, the movement of the handles can be restricted to occur at a predetermined angle in the rotation of the rotatable structure by generating a net angular momentum only at the predetermined angle. This is accomplished in the manner described below.

In accordance with one or more embodiments, for the gyroscopes to precess about a single, predetermined axis, a net angular momentum is generated in a small angular sector ($\Delta\Theta$) and, during the rest of the rotation phase of the rotatable structure, the net angular momentum is maintained at zero.

Figure 5:
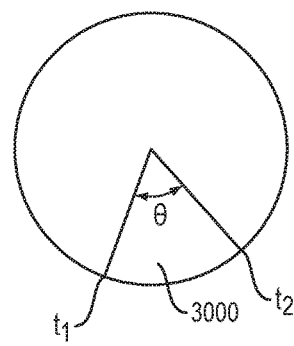
FIG. 5 shows a full circle that represents a 360° range of rotation of a rotatable structure that supports the gyroscopes comprising haptic device 2000 illustrated in FIG. 4.

FIG. 5 shows a full circle that represents a range of rotation (for example, a 360° range of rotation) of the rotatable structure that supports the gyroscopes comprising haptic device 2000 illustrated in FIG. 4 (in other words, the range of rotation of the line through the symmetry axes of the gyroscopes). Assume non-zero haptic output is desired in one angular section of the range of rotation. In this case, FIG. 5 indicates angular sector 3000 to represent an angular sector ($\Delta\Theta$) within which gyroscopes 2010 and 2020 are driven to provide a net angular momentum. At all other angles, gyroscopes 2010 and 2020 are driven, by motors (not shown for ease of understanding) in response to a one or more motor controllers (not shown for ease of understanding), to spin at the same magnitude of speed in opposite directions, thereby each canceling the other's angular momentum. Thus, from time t1 to time t2, the gyroscopes are accelerated at different rates to provide a different angular momentum for each (thereby creating a non-zero net angular momentum). Then, from time t2 to time t3, the gyroscopes are decelerated at different rates to provide an equal angular momentum for each (thereby creating zero net angular momentum). Alternatively, from time t1 to time t2, one gyroscope is accelerated and the other decelerated, for example, at the same rate, to provide a different angular momentum for each (thereby creating a non-zero net angular momentum). Then, from time t2 to time t3, the one gyroscope is decelerated and the other gyroscope is accelerated, for example, at the same rate, to provide an equal angular momentum for each (thereby creating zero net angular momentum).

If haptic device 2000 were to use one gyroscope to enable haptic output only in angular sector 3000, that gyroscope would need to completely lack any angular speed until it would reach angular sector 3000 indicated in FIG. 5, at which point it would need to accelerate and decelerate between times t3 and t1. However, if the time between t3 and t1 is very short, for example, on the order of milliseconds, the use of two oppositely spinning gyroscopes is preferred because they would not need to accelerate as rapidly.

Figure 6:
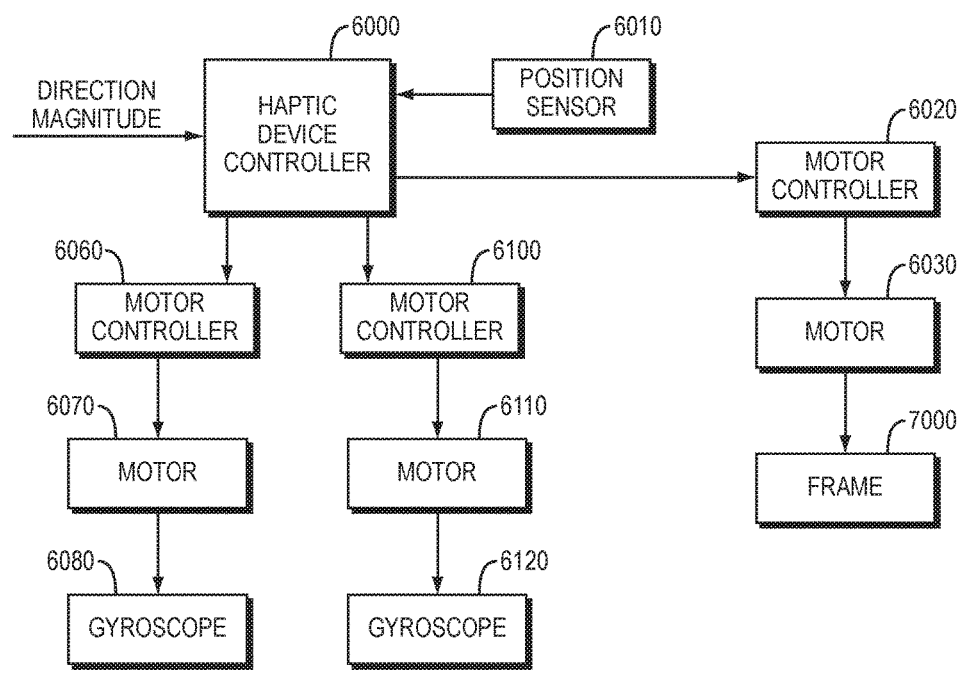
FIG. 6 shows a block diagram of various controllers that are used in fabricating one or more embodiments.

FIG. 6 shows a block diagram of various controllers and motors that are used in fabricating one or more embodiments. Assume for purposes of the following description that the angular momentum generator apparatus comprises two oppositely rotating gyroscopes. As shown in FIG. 6, haptic device controller 6000 receives input specifying a direction and a magnitude for haptic output. As further shown in FIG. 6, position sensor 6010 detects an angular position of the angular momentum generator apparatus as it rotates under the influence of the torque applied thereto by the torque generator apparatus. Alternatively, position sensor 6010 detects the position of, for example and without limitation, a location from which the angular position of the angular momentum generator apparatus can be determined in accordance with any one of a number of methods that are well known to those of ordinary skill in the art. In accordance with one or more such embodiments, position sensor 6010 may be fabricated using any one of a number such devices that are well known to those of ordinary skill in the art. As further shown in FIG. 6, in response to the input, haptic device controller 6000 sends signals to motor controllers 6060 and 6100, which motor controllers 6060 and 6100, in turn, send signals to motors 6070 and 6110, respectively, to cause them to drive gyroscopes 6080 and 6120, respectively, (in the manner discussed above with respect to FIG. 5) to produce a non-zero net angular momentum in a particular angular sector (the angular sector is determined in the manner described below), and to produce a net angular momentum equal to zero otherwise. It should be understood that, in accordance with one or more embodiments, the functionality provided by haptic device controller 6000 and motor controllers 6060 and 6100 may be carried out by a single controller; namely, haptic device controller 6000. In addition, in accordance with one or more embodiments, motors 6070 and 6110 may be coupled to gyroscopes 6080 and 6120, respectively, using one or more gears (not shown for ease of understanding).

As further shown in FIG. 6, haptic device controller 6000 sends a signal to motor controller 6020, which motor controller 6020, in turn, sends a signal to motor 6030 to cause it to produce a particular value of angular velocity (the value of angular velocity is determined in the manner described below). It should be understood that, in accordance with one or more embodiments, the functions provided by haptic device controller 6000 and motor controller 6020 may be carried out by a single controller; namely, haptic device controller 6000. In addition, in accordance with one or more embodiments, motor 6030 may be coupled to angular momentum generator apparatus using one or more gears (not shown for ease of understanding).

In accordance with one or more embodiments, haptic device controller 6000, motor controller 6020, and motor controllers 6060 and 6100 may be fabricated using any one of a number of microcontrollers that are well known to those of ordinary skill in the art. In addition, in accordance with one or more further embodiments described below with respect to FIG. 8, haptic device controller 6000, motor controller 6020, motor controllers 6060 and 6100, and position sensor 6010 may be positioned on a rigid frame that also carries motors 6070, 6110 and 6030; gyroscopes 6080 and 6120; and a power supply used to supply power to the various components.

Haptic device 2000 may be configured in accordance with one or more embodiments by performing the following steps. (1) Determine empirically (i.e., by measurement) the angular velocity of the angular momentum generator apparatus as a function, for example and without limitation, of input power applied to motor 6030 of the torque generator apparatus ($\omega_{motor}$), and save the results in haptic device controller 6000 as data set 1 ("DS1"). (2) Then, determine empirically the moment of inertia of gyroscopes 6080 and 6120 about their symmetry axes ($I_{gyroscope}$) using any one of a number of methods that are well known to those of ordinary skill in the art and save the results in haptic device controller 6000 as data set 2 ("DS2"). (3) Then, determine empirically the angular velocity of gyroscope 6080 ($\omega_{gyroscope}$) about its symmetry axis as a function, for example and without limitation, of input power to motor 6070 and the angular velocity of gyroscope 6120 about its symmetry axis as a function, for example and without limitation, of input power to motor 6110, and save the results in haptic device controller 6000 as data set 3 ("DS3"). (4) Then, determine empirically the angular acceleration of gyroscope 6080 (α) about its symmetry axis as a function, for example, of input power to motor 6070 and the angular acceleration of gyroscope 6120 about its symmetry axis as a function, for example and without limitation, of input power to motor 6110, and save the results in haptic device controller 6000 as data set 4 ("DS4"). For ease of understanding, the following assumes that gyroscopes 6080 and 6120 are identical, motors 6070 and 6110 are identical, and that motor controllers 6060 and 6100 are identical. However, in light of the explanation set forth below, it will be clear to one of ordinary skill in the art that further embodiments exist wherein one or more of the above apparatuses are not identical, and it will be clear to one of ordinary skill in the art how to fabricate such further embodiments in light of the description herein.

As discussed above with reference to FIG. 5, let the angular velocity of gyroscope 6080 accelerate from time t1 to time (t1+t3)/2 at an acceleration rate α, and then decelerate from time (t1+t3)/2 to time t3 at a deceleration rate α, and let gyroscope 6120 do the opposite. Then, the maximum difference in angular velocity will be α(t3−t1) where t3−t1=δ is the extent of the angular sector (i.e., δt represents the time over which haptic output will be confined to a particular direction). For example, δt may be set to a pre-configured value stored as data set 5 ("DS5") so that the particular direction may be restricted to a predetermined amount. Thus eqn. (13) above can be rewritten as:

$$\tau_{feel} = \omega_{motor} * I_{gyroscope} * \alpha * \delta t \quad (14)$$

As one can readily appreciate from the above, the range of magnitude of the haptic output ($\tau_{feel}$) will depend on the range of values of the parameters in eqn. (14), which parameters are determined by the gyroscopes and motors used to fabricate embodiments.

Now, in accordance with one or more embodiments, in response to the input specifying a direction and a magnitude for haptic output, haptic device controller 6000 uses data sets DS1, DS2, DS4, and DS5 to determine whether the specified magnitude can be produced using any of the achievable values of $\omega_{motor}$ specified in DS1, using the value of $I_{gyroscope}$ specified in DS2, using any of the achievable values of α specified in DS4, and using the value of & specified in DS5. In accordance with one or more embodiments, if the product of the parameters (using achievable parameters) from the right hand side of eqn. (14) exceeds the specified magnitude, then one or more of the values chosen for the achievable parameters may be reduced in accordance with a predetermined design choice. For example, the value of $\omega_{motor}$ may be reduced by a predetermined amount to reduce the power supplied to motor 6030, and/or the value of a may be reduced by a predetermined amount to reduce the power supplied to motors 6070 and 6110. Then, using data sets DS1 and DS4, haptic device controller 6000 determines the power to be supplied by motors 6070, 6110, 6030 to produce the values of $\omega_{motor}$ and a identified above. Next, using data set DS4, haptic device controller 6000 determines the power to be supplied to motors 6070 and 6110 to produce a value of $\omega_{gyroscope}$ when gyroscopes 6080 and 6120 produce no net angular momentum along their joint symmetry axis. Such a value may of $\omega_{gyroscope}$ may be a predetermined design choice. Next, haptic device controller 6000 determines the position of t1 (referring to FIG. 5) in order to provide haptic output in the specified direction. Next, haptic device controller 6000 receives input from position sensor 6010 which, for example and without limitation, detects a predetermined position of rotation of the angular momentum generator apparatus as it rotates under the influence of the torque applied thereto by motor 6030, and the time of such detection. Next, haptic device controller 6000 determines, given time t1 and the rate of rotation ($\omega_{motor}$), the time at which to start to change the net angular momentum provided by gyroscopes 6080 and 6120. Next, haptic device controller 6000 applies the signals described above with respect to FIG. 4 using the magnitudes and timing in accordance with the description above.

Components used to fabricate one or more embodiments include: a VEX Cortex microcontroller, VEX Robotics metal, sensors, and motors with integrated motor encoder sensors. Programming of the VEX Cortex microcontroller necessitated use of a RobotC programming platform. VEX high strength actuators with a gear box having a gear ratio of 1:9 gear ratio (two 1:3 gears in series) were used to fabricate gyroscopes. A first embodiment consisted of a single gyroscope (driven by a motor) mounted onto a stick-like rotational structure. Weights were arranged to balance the weight around the center of the device so that torque generator apparatus could be attached thereat. A second embodiment added a second gyroscope (driven by a second motor) to the rotational structure, the second gyroscope was mounted opposite to the already established gyroscope to help balance the device's center of mass towards the midpoint of the rotational structure (i.e., at the point of rotation of the two gyroscopes). Then the rotational structure was attached to a third motor via a simple axle. A third embodiment included the second embodiment which further included a rotation mechanism where the third motor could rest on top of the rotational structure while also spinning it.

Figure 7:
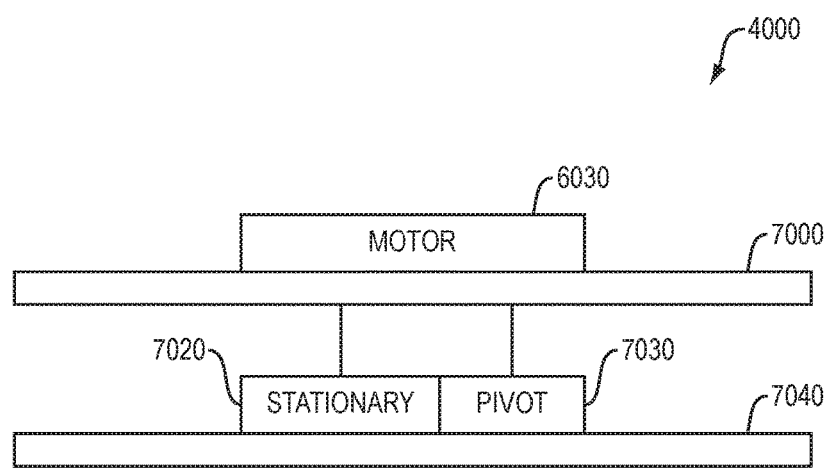
FIG. 7 is a schematic diagram of a torque generator apparatus for use in fabricating haptic device 2000 illustrated in FIG. 4.

FIG. 7 is a schematic diagram of a torque generator apparatus for use in fabricating haptic device 2000 illustrated in FIG. 4 As shown in FIG. 7: (a) motor 6030 is affixed to rotatable structure 7000 (i.e., rigid frame 7000); (b) motor 6030 is coupled to stationary gear 7020 and pivot gear 7030; (c) stationary gear 7020 is affixed to base 7040; and (d) pivot gear 7030 is coupled to stationary gear 7020 (i.e., pivot gear 7030 contacts stationary gear 7020 at all times). In operation, motor 6030 drives pivot gear 7020 and, as a result, rotatable structure 7000 is driven into rotation (it is analogous to how a rower moves a canoe).

Figure 8:
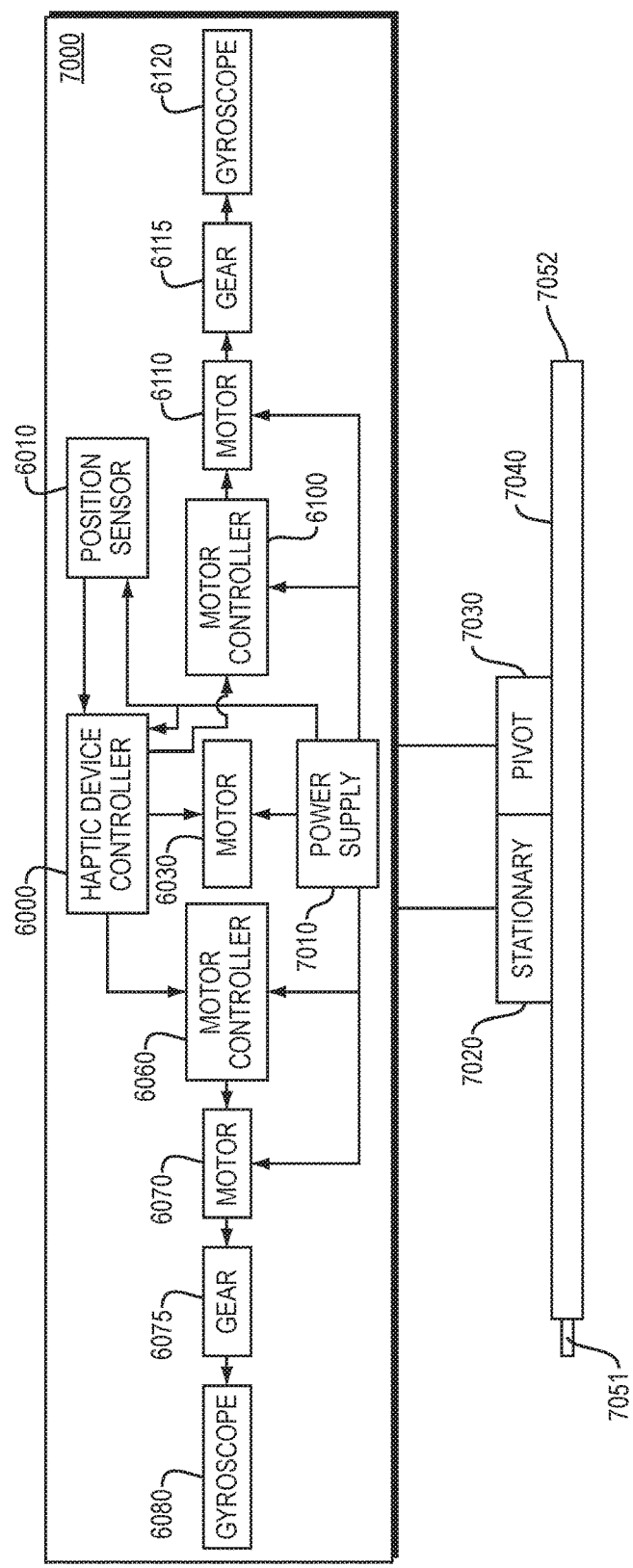
FIG. 8 is a schematic diagram of an embodiment of haptic device 2000.

FIG. 8 is a schematic diagram of an embodiment of haptic device 2000. As shown in FIG. 8, haptic device 2000 comprises balanced rigid frame 7000 upon which gyroscopes 6080 and 6120 (comprised of wheels) are mounted. As further shown in FIG. 8: (a) motor controller 6060 is connected to motor 6070, which motor 6070 is coupled by one or more gears 6075 to gyroscope 6080 (all of which are mounted on rigid frame 7000); (b) motor controller 6100 is connected to motor 6110, which motor 6110 is coupled by one or more gears 6115 to gyroscope 6120 (all of which are mounted on rigid frame 7000); (c) motor 6030 is mounted on rigid frame 7000 (motor 6030 causes rigid frame 7000 to rotate in the manner described above with reference to FIG. 7); (d) motor 6030 is coupled to stationary gear 7020 and pivot gear 7030; (e) stationary gear 7020 is affixed to base 7040 and pivot gear 7030 is coupled to stationary gear 7020; (f) handles 7051 and 7052 are affixed to base 7040; and (g) power supply 7010 (for example and without limitation, a rechargeable battery) is affixed to base 7040 and is electrically coupled to haptic controller 6000, motor controllers 6060, and 6100, position sensor 6010, and motors 6070, 6110, and 6030.

Although one or more embodiments have been described as using one and two gyroscopes, further embodiments exist which comprise the use of more gyroscopes.

Embodiments of the present invention described above are exemplary. As such, many changes and modifications may be made to the description set forth above by those of ordinary skill in the art while remaining within the scope of the invention. For example, in alternative embodiments: (a) the material might be made from relatively light materials such as, for example and without limitation, plastics to enhance user comfort; (b) the motors might be relatively small, light, and possess a relatively large RPM and maximum torque so as to generate a relative large range of induced torques; (c) the haptic device ought to be substantially balanced; (d) the mounted gyroscopes can be a chip-like wafer with two wheels on either side; (e) the controller would include software to generate different patterns of torque; (f) the moment of inertia of the wheels might be increased without increasing weight by spreading the mass of the object towards its perimeter; and (g) the opposing gyroscopes would be mounted inside a three axis gimbal that would rotate the user handle in all three axes of rotation. In addition, materials, methods, and mechanisms suitable for fabricating embodiments of the present invention have been described above by providing specific, non-limiting examples and/or by relying on the knowledge of one of ordinary skill in the art. Materials, methods, and mechanisms suitable for fabricating various embodiments or portions of various embodiments of the present invention described above have not been repeated, for sake of brevity, wherever it should be well understood by those of ordinary skill in the art that the various embodiments or portions of the various embodiments could be fabricated utilizing the same or similar previously described materials, methods or mechanisms. As such, the scope of the invention should be determined with reference to the appended claims along with their full scope of equivalents.

What is claimed is:

1. A haptic device comprises:
a first gyroscope having a first axis and a second gyroscope having a second axis wherein the first gyroscope and the second gyroscope are affixed to a frame so the first and second axes are aligned, which gyroscopes are adapted to generate predetermined values of combined angular momentum in a first direction with respect to the aligned axes of the gyroscopes;
a torque generator apparatus coupled to the frame, which torque generator apparatus is adapted to apply a torque to the frame to cause the first and second gyroscopes to rotate about a second direction which is perpendicular to the first direction; and
a base coupled to the torque generator apparatus so that rotation of the gyroscopes caused by the torque generator apparatus does not cause rotation of the base.

2. The haptic device of claim 1 which further comprises:
a controller and a position sensor;
wherein:
the torque generator apparatus comprises a torque generator motor coupled to the frame;
the position sensor is coupled to the controller;
the controller is coupled to the first and second gyroscopes and is adapted to cause them to generate the predetermined values of combined angular momentum; and
the controller is coupled to the torque generator motor and is adapted to cause the torque generator motor to apply the torque to the frame.

3. The haptic device of claim 2 wherein the controller is adapted to cause the first and second gyroscopes to generate a first angular momentum and a second angular momentum, respectively, so that the magnitude of the combined angular momentum is zero during at least a portion of the rotation about the second direction and so that the magnitude of the combined angular momentum is non-zero during at least another portion of the rotation about the second direction.

4. The haptic device of claim 3 wherein the controller is adapted to cause the first angular momentum and the second angular momentum to have the same magnitude and point in opposite directions so that the magnitude of the combined angular momentum is zero.

5. The haptic device of claim 3 wherein the controller is adapted to cause the first angular momentum and the second angular momentum to have different magnitudes and point in opposite directions so that the magnitude of the combined angular momentum is non-zero.

6. The haptic device of claim 3 wherein the first and second gyroscopes are the same type of gyroscope.

7. The haptic device of claim 2 further comprises:
the first gyroscope comprises a first spinning wheel and the second gyroscope comprises a second spinning wheel;
a first motor coupled to the first gyroscope and a second motor coupled to the second gyroscope;
wherein:
the controller is coupled to the first motor and the second motor; and
the controller is adapted: (a) to cause the first motor to cause the first spinning wheel to rotate to generate the first angular momentum and (b) to cause the second motor to cause the second spinning wheel to rotate to generate the second angular momentum.

8. The haptic device of claim 7 wherein:
the controller is adapted to cause the first spinning wheel and the second spinning wheel to rotate in opposite directions and at the same angular velocity so that the magnitude of the combined angular momentum is zero; and
the controller is adapted to cause the first spinning wheel and the second spinning wheel to rotate in opposite directions and at different angular velocities so that the magnitude of the combined angular momentum is non-zero.

9. The haptic device of claim 1 which further comprises a handle mechanism coupled to the base.

10. The haptic device of claim 9 wherein the handle mechanism is adapted to be held using two hands.

11. The haptic device of claim 10 wherein the handle mechanism comprises two handles.

* * * * *